Aug. 14, 1945.   C. A. PETERSEN   2,382,908
ELECTRIC PROTECTIVE SYSTEM
Filed May 11, 1944
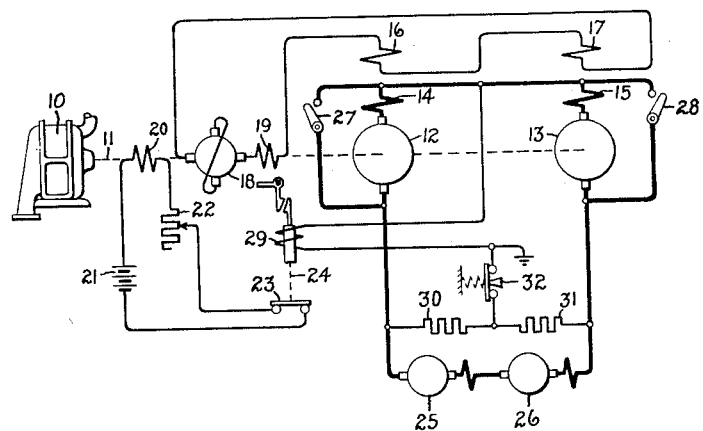
Inventor:
Charles A. Petersen,
by Harry E. Dunham
His Attorney.

Patented Aug. 14, 1945

2,382,908

UNITED STATES PATENT OFFICE 2,382,908

ELECTRIC PROTECTIVE SYSTEM

Charles A. Petersen, Erie, Pa., assignor to General Electric Company, a corporation of New York Application May 11, 1944, Serial No. 535,081

7 Claims. (Cl. 172—279)

My invention relates to electric protective systems, and more particularly to systems for protecting series connected electric generators against ground faults and internal short-circuits. A general object of the invention is the provision of new and improved means of the above character which is simple in construction and arrangement, and reliable and effective in operation.

It is a more specific object of my invention to provide a protective system including a combined ground and differential voltage relay for protecting series connected electric generators against both ground and short-circuit faults.

My invention itself will be more fully understood and its objects and advantages further appreciated by referring now to the following detailed specification taken in conjunction with the accompanying drawing, the single figure of which is a schematic circuit diagram of an electric protective system embodying my invention.

In the drawing I have shown my invention applied to the protection of series connected direct current generators in a power system of a type which may, for example, be utilized to drive a self-propelled electric vehicle. Assuming by way of specific illustration that the power system shown is so utilized, the system itself comprises a prime mover, such as a fluid pressure turbine 10, connected through a shaft 11 to drive a pair of direct current generators having armatures 12 and 13, series commutating field windings 14 and 15, respectively, and main field exciting windings 16 and 17, respectively. The prime mover 10 also drives a generator exciter 18 connected to supply excitation current to the main generator field exciting windings 16 and 17. Preferably, the generator exciter 18 is an amplidyne machine of the type described and claimed in Patent No. 2,227,992, issued to E. F. W. Alexanderson and M. A. Edwards, and includes a series field compensating winding 19 and a main control field winding 20. The main control field winding 20 is energized from a suitable source of direct current supply, such as a battery 21, through a manually controllable variable resistor 22 and the normally closed contacts 23 of a protective latching relay 24.

The armatures 12 and 13 of the main generators are connected in series circuit relation to supply current to an output circuit including a pair of electric traction motors 25 and 26. The main power circuit also includes a pair of manually operable switches 27 and 28 arranged when closed to short-circuit the generator armatures 12 and 13, respectively. The manual switches 27 and 28 are normally open and are provided for emergency operation only, as when it becomes necessary, due to some internal generator fault, to disable one of the generators and operate the vehicle on the other generator alone.

In order to provide protection against ground faults occurring in either of the generator armatures or at any point in the output circuit, the common terminal of the generator armatures 12 and 13 is connected to ground through an actuating winding 29 of the protective relay 24. It will be understood that normally the actuating winding 29 carries no current, since no other point on the generator armature circuit is grounded. However, in the event that a ground occurs in either of the generator armatures or in the generator output circuit, a circulating current will flow through a path including the relay winding 29, thereby to actuate the relay and to open the field energizing circuit for the generator exciter 18. In this manner excitation is removed from the main generators. The relay 29 must be reset manually, although the latch release may of course be remotely controlled.

According to my invention, means are provided for utilizing the ground fault relay 24 to detect also differential faults, such as may occur as a result of short-circuiting of all or a portion of one of the generator armatures. For this purpose a voltage divider including a pair of resistors 30 and 31 is connected across the electrically remote terminals of the generator armatures 12 and 13 and the mid-point of the voltage divider is connected to the grounded side of the relay winding 29. In this manner the relay actuating winding 29 is connected for response to a difference of the terminal voltages of the generators. Since the generator voltages are normally equal, the relay winding 29 normally carries no differential current, but is energized whenever the voltage of one generator differs from that of the other.

It will be noted that the connection between the grounded terminal of the relay winding 29 and the mid-point of the voltage divider 30, 31 is made through a manually operable switch 32. The switch 32 is normally closed, so that the relay 24 is responsive both to ground faults and to short-circuit faults. It is necessary, however, to disable the differential voltage connection of the relay whenever one of the shunting switches 27 or 28 is closed to operate the vehicle upon one generator alone. It is for this purpose that the switch 32 is provided.

While I have described only a preferred embodiment of my invention by way of illustration, many modifications will occur to those skilled in the art, and I therefore wish to have it understood that I intend in the appended claims to cover all such modifications as fall within the true spirit and scope of my invention.

What I claim as new and desire to secure by Letters Patent of the United States is:

1. A protective system comprising a pair of direct current electric generators provided with field exciting windings and having their armatures connected in series circuit relation to supply current to an output circuit, voltage responsive means for connecting the common terminal of said armatures to a point of predetermined fixed potential, and voltage dividing means connecting said voltage responsive means for response to a difference in the voltage of said generators.

2. A protective system comprising a pair of direct current electric generators provided with field exciting windings and having their armatures connected in series circuit relation to supply current to an output circuit, a relay having an actuating winding connected between the common terminal of said armatures and ground to detect ground faults in either of said generators or their output circuits, means for connecting said winding for differential response to the terminal voltages of said generators to detect short-circuit faults in said generators, and means actuated by said relay to disable said field exciting windings.

3. A protective system comprising a pair of direct current electric generators provided with field exciting windings and having their armatures connected in series circuit relation to supply current to an output circuit, a relay having an actuating winding connected between the common terminal of said armatures and ground to determine ground faults in either of said generators or their output circuits, means for connecting said winding for differential response to the terminal voltages of said generators to detect short-circuit faults in said generators, and switching means for disabling said differential relay connection without disabling said ground connection.

4. A protective system comprising a pair of direct current electric generators provided with field exciting windings and having their armatures connected in series circuit relation to supply current to an output circuit, a relay having an actuating winding connected between the common terminal of said armatures and ground to detect ground faults in either of said generators or their output circuits, voltage dividing means connected between the electrically remote terminals of said armatures, and means for connecting the mid-point of said voltage dividing means to ground thereby to render said relay responsive to short-circuit faults in said generators.

5. A protective system comprising a pair of direct current electric generators provided with field exciting windings and having their armatures connected in series circuit relation to supply current to an output circuit, a relay having an actuating winding connected between the common terminal of said armatures and ground to detect ground faults in either of said generators or their output circuits, voltage dividing means connected between the electrically remote terminals of said armatures, first switching means for connecting the mid-point of said voltage dividing means to ground thereby to render said relay differentially responsive to the terminal voltages of said generators, said first switching means being operable to disconnect said actuating winding from said voltage dividing means thereby to render said relay non-responsive to generator voltage differential, second switching means for selectably disabling said generators, and means actuated by said relay to disable said field exciting windings.

6. A protective system comprising a pair of direct current electric generators provided with field exciting windings and having their armatures connected in series circuit relation to supply current to an output circiut, a relay having an actuating winding connected between the common terminal of said armatures and a point of predetermined fixed potential, voltage dividing means connected between the electrically remote terminals of said armatures, and means for connecting said actuating winding between said common terminal and a point of normally equal potential on said voltage dividing means.

7. A protective system comprising a pair of direct current electric generators provided with field exciting windings and having their armatures connected in series circuit relation to supply current to an output circuit, a relay having an actuating winding connected between the common terminal of said armatures and a point of predetermined fixed potential, voltage dividing means connected between the electrically remote terminals of said armatures, first switching means for connecting said actuating winding between said common terminal and a point of normally equal potential on said voltage dividing means for differential response to the terminal voltages of said generators, said first switching means being arranged to disable said differential connection without disabling connection of said actuating winding to said point of fixed potential, and second switching means for selectably disabling either of said generators.

CHARLES A. PETERSEN.